United States Patent [19]

Wick

[11] Patent Number: 4,573,307

[45] Date of Patent: * Mar. 4, 1986

[54] LAWN MOWER DEAD MAN CONTROL

[75] Inventor: Gerald H. Wick, Galesburg, Ill.

[73] Assignee: Outboard Marine Corporation, Waukegan, Ill.

[*] Notice: The portion of the term of this patent subsequent to Jan. 15, 2002 has been disclaimed.

[21] Appl. No.: 462,624

[22] Filed: Jan. 31, 1983

Related U.S. Application Data

[63] Continuation-in-part of Ser. No. 429,060, Sep. 30, 1982.

[51] Int. Cl.$^4$ .............................................. A01D 75/20
[52] U.S. Cl. ..................................... 56/11.8; 56/10.8; 56/11.3; 74/480 R
[58] Field of Search ...................... 56/10.5, 10.8, 10.2, 56/11.3, 11.4, 11.8, 17.5, DIG. 18; 192/0.094; 74/479, 480 R, 489, 483

[56] References Cited

U.S. PATENT DOCUMENTS

| | | | |
|---|---|---|---|
| 3,543,892 | 12/1970 | DeBaillie | 192/11 |
| 3,958,398 | 6/1976 | Fuelling, Jr. et al. | 56/10.5 |
| 4,221,108 | 9/1980 | Owens | 56/11.3 |
| 4,281,732 | 7/1981 | Hoch | 187/19.3 |
| 4,309,862 | 1/1982 | Carlson | 56/10.5 |
| 4,327,539 | 5/1982 | Bricko et al. | 56/11.3 |
| 4,335,566 | 6/1982 | Hurd | 56/11.8 |
| 4,493,180 | 1/1985 | Wick | 56/11.3 |

FOREIGN PATENT DOCUMENTS

| | | | |
|---|---|---|---|
| 0019233 | 1/1983 | European Pat. Off. | 56/11.3 |
| 0062359 | 6/1983 | European Pat. Off. | 56/11.3 |
| 2415952 | 7/1983 | France | 56/11.8 |
| 2013467 | 1/1980 | United Kingdom | 56/11.8 |
| 2025562 | 2/1980 | United Kingdom | 56/11.3 |
| 2070207 | 8/1980 | United Kingdom | 56/10.5 |
| 2102901 | 2/1983 | United Kingdom | 56/10.3 |
| 2130466 | 10/1983 | United Kingdom | 56/11.3 |
| 2139329 | 12/1983 | United Kingdom | 56/11.3 |

Primary Examiner—Gene Mancene
Assistant Examiner—John G. Weiss
Attorney, Agent, or Firm—Michael, Best & Friedrich

[57] ABSTRACT

A lawn mower including a blade housing supporting a prime mover which drives a cutter blade. The prime mover causes rotation of a drive shaft and a clutch driven by the drive shaft is engagable and disengagable with the cutter blade. A handle is connected to the housing and a control is pivotally attached to the handle. The lawn mower further includes an arrangement operable to permit the engagement and disengagement of the clutch by the pivotal movement of the dead man control. This arrangement includes a flexible member connecting the control and the clutch and an arrangement restricting a substantial portion of the flexible member to a predetermined path along the handle. The restricting arrangement includes a pulley rotatably attached to the handle between the control and the housing and the flexible member is guided around the pulley.

In one embodiment, the mower includes a mower propelling arrangement and an upper handle is movably attached to a guiding handle. A link connects the upper handle to the mower propelling arrangement and the link is movable in response to movement of the upper handle to cause engagement of the mower propelling arrangement. The self-propelled lawn mower has the control movably attached to the upper handle and the pulley has a periphery generally adjacent the attachment of the upper handle to the guiding handle so the upper handle and control can be operated independently.

23 Claims, 6 Drawing Figures

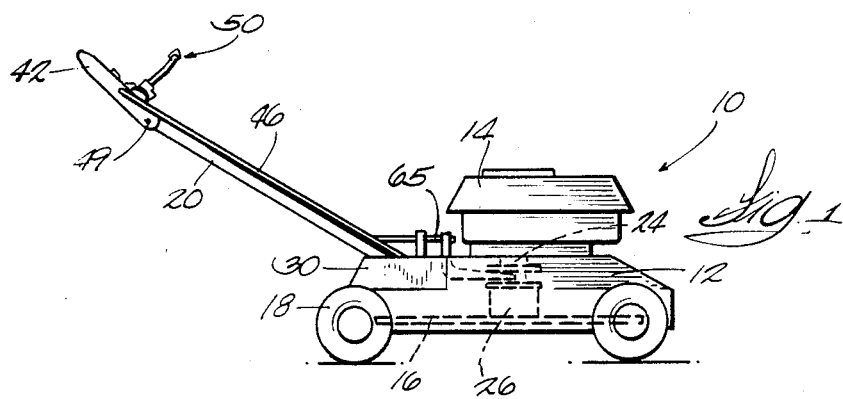
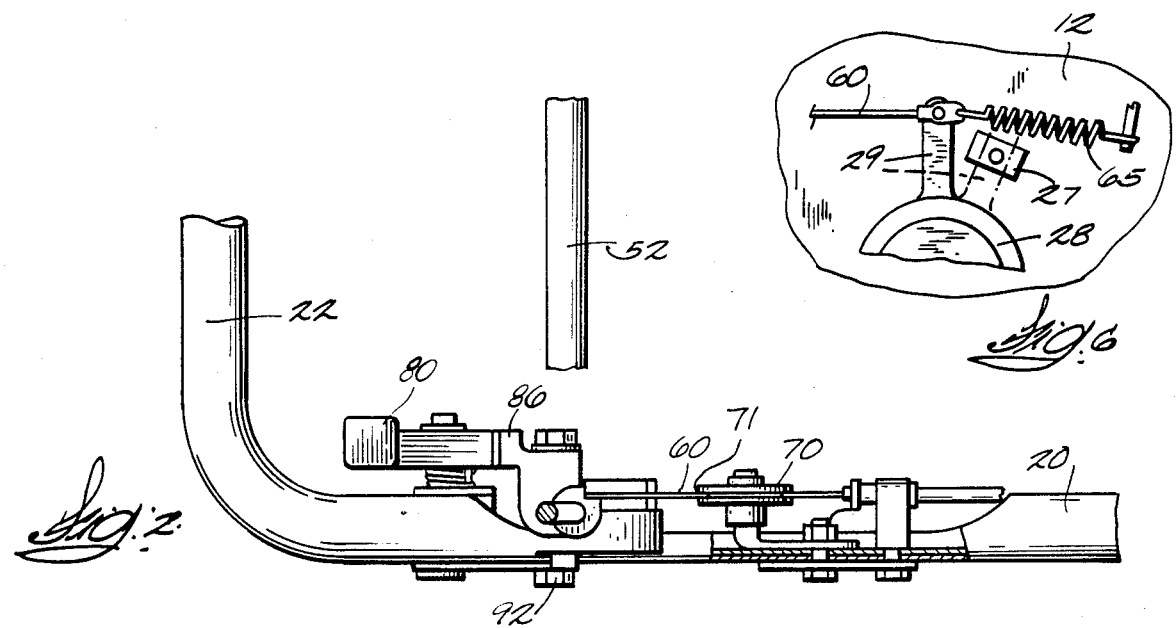
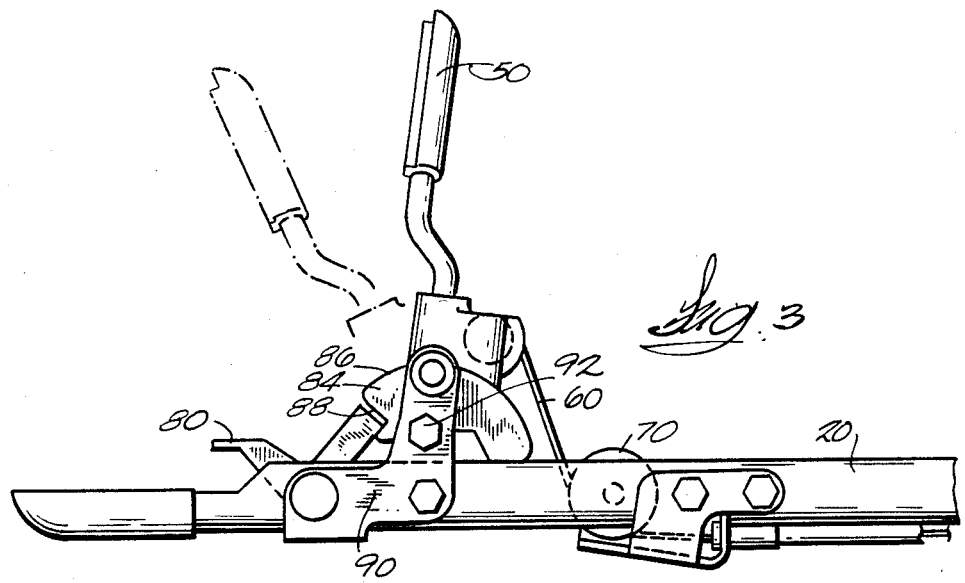

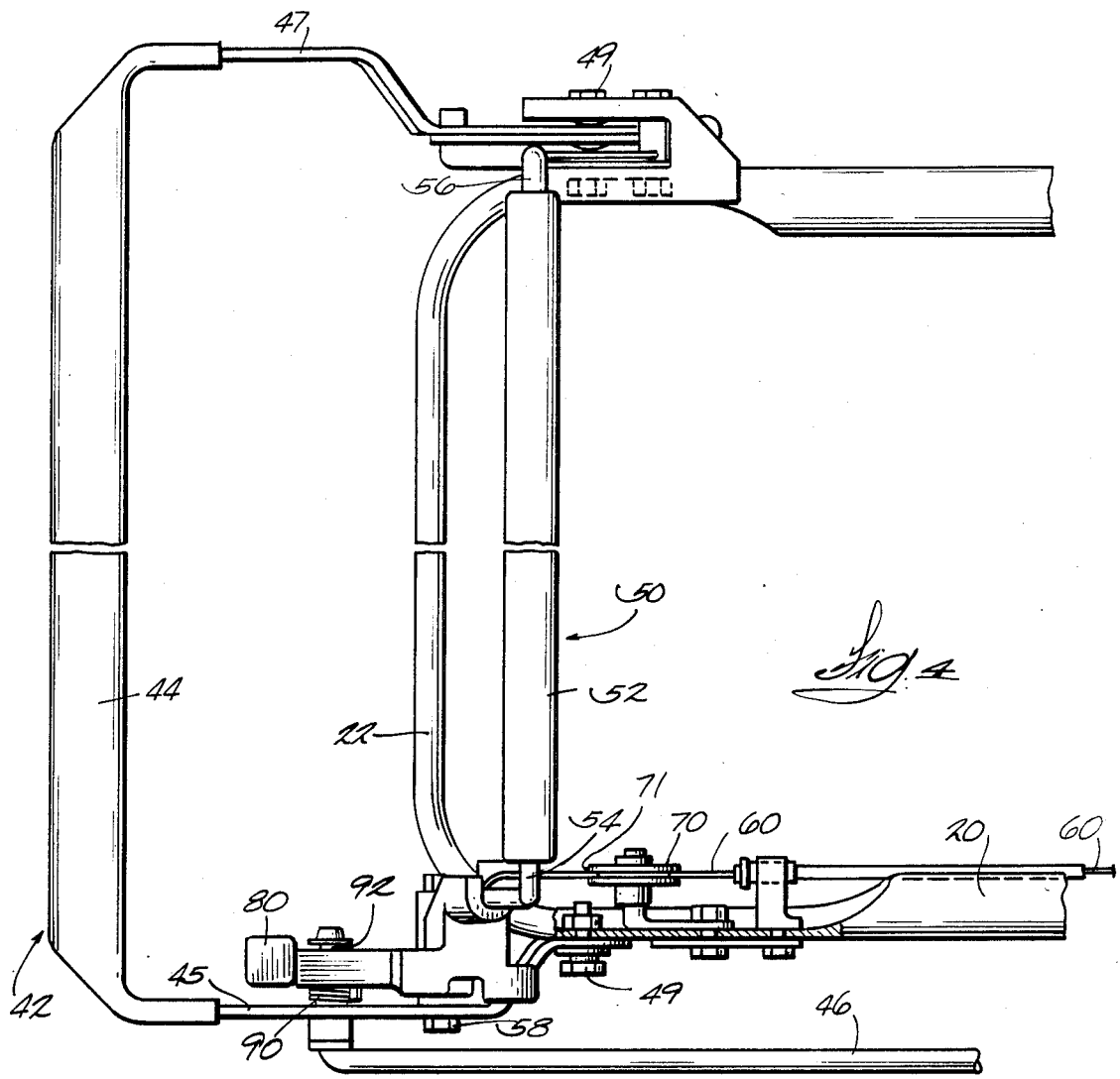
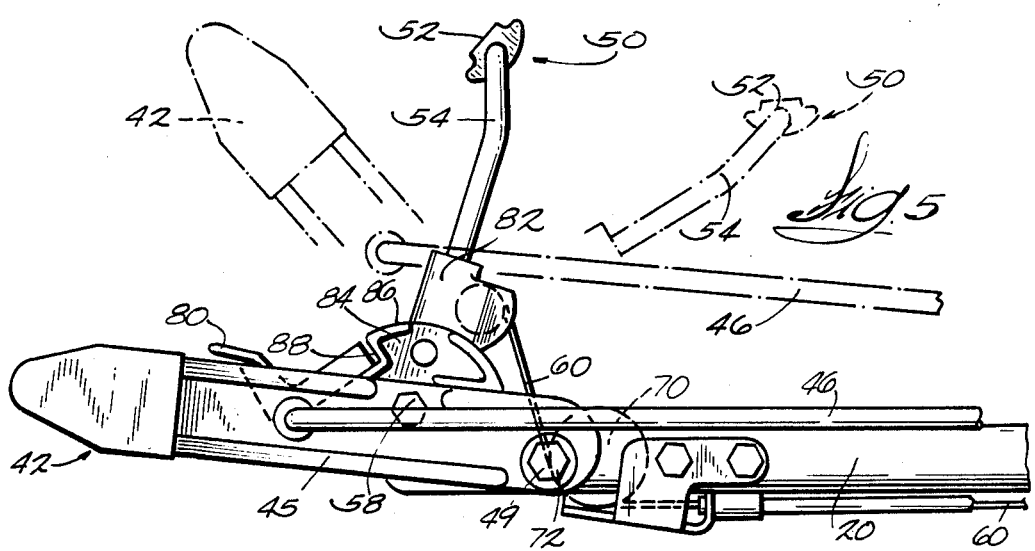

LAWN MOWER DEAD MAN CONTROL

RELATED APPLICATIONS

This application is a continuation-in-part of my earlier application filed Sept. 30, 1982 as Ser. No. 429,060.

BACKGROUND AND SUMMARY OF THE INVENTION

This invention relates to dead man control arrangements for both push and self-propelled lawn mowers. Attention is directed to Hurd, U.S. Pat. No. 4,335,566 which discloses a single control member for actuating a clutch drive and mower propelling means, unlike the invention disclosed herein.

Attention is directed to a co-pending patent application filed by LaVerne D. Smith on Aug. 7, 1981 as Ser. No. 291,013, which is directed to energizing means including an electric switch and which is incorporated herein by reference.

The invention provides a lawn mower including a blade housing supporting a prime mover which drives a cutter blade. The prime mover causes rotation of a drive shaft and energizing means is provided for permitting energizing of the cutter blade which is operably connected to the drive shaft. A handle is connected to the housing and a control is movably attached to the handle.

The lawn mower further includes means for operating said energizing means by the movement of the control. This means includes a flexible member connecting the control and the energizing means and means for restricting a substantial portion of the flexible member to a predetermined path along the handle. The restricting means includes a pulley rotatably attached to the handle between the control and the housing and the flexible member is guided around the pulley.

In one embodiment, the lawn mower includes biasing means biasing the control toward a de-energized blade position and the biasing means and energizing means comprises a self-biasing clutch.

In one embodiment, the mower is self-propelled and includes travel means connected to the housing supporting travel of the housing over the ground. The mower also includes mower propelling means engagable with the travel means for propelling the mower over the ground. An upper handle is movably attached to the guiding handle and linkage means connects the upper handle to the mower propelling means. The linkage means is movable in response to movement of the upper handle to cause the operation of the mower propelling means. The self-propelled lawn mower has the control movably attached to the upper handle and the pulley has a periphery generally adjacent the attachment of the upper handle to the guiding handle so the upper handle and control can be operated independently.

In one embodiment, the lawn mower includes a lock lever means for preventing the inadvertent movement of the control. The lock lever means comprises a V-shaped lever pivotally attached to the guiding handle adjacent a plate with a rounded edge attached to the control adjacent the attachment of the control to the guiding handle. The plate's rounded edge includes a notch and the V-shaped lever is pivotable between a position where the lever is received in the notch and prevents the pivotal movement of the control and a position where the lever is out of the notch and permits the pivotal movement of the control.

Various of the features and advantages of various embodiments of the invention will become apparent upon reviewing the following drawings, the detailed description and the appended claims.

BRIEF DESCRIPTION OF THE DRAWINGS

FIG. 1 is a side view of a self-propelled lawn mower including various of the features of the invention.

FIG. 2 is a top view partially in section of the upper portion of a guiding handle for a push lawn mower.

FIG. 3 is a side view of the upper portion of the guiding handle shown in FIG. 2.

FIG. 4 is a top view partially in section of the upper portion of a guiding handle portion of the self-propelled lawn mower shown in FIG. 1.

FIG. 5 is a side view of the upper portion of the guiding handle shown in FIG. 4.

FIG. 6 is a partial perspective view of a blade energizing means.

Before explaining at least one embodiment of the invention in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology employed herein is for the purposes of description and should not be regarded as limiting.

DESCRIPTION OF THE PREFERRED EMBODIMENT

Shown in the drawings is a lawn mower 10 including a blade housing 12 supporting a prime mover 14 which drives a cutter blade 16. The blade housing 12 is suitably supported for travel over the ground by a plurality of wheels 18 and is guided for travel over the ground by a guiding handle 20. The guiding handle 20 is generally U-shaped and includes a cross bar 22 at the upper or operator end.

More particularly, the prime mover 14 can be either an internal combustion engine or an electric motor which rotatably drives an output or drive shaft or an alternative drive member 24 including a lower end portion adapted to support and drive the rotary cutter blade 16.

Further included is energizing means 26 for permitting energizing of or delivering of power to a rotary component driven by the engine such as a propelling wheel or the cutter blade 16. In the disclosed construction the energizing means 26 is a clutch and brake means for providing a selective driving engagement between the drive shaft 24 and the cutter blade 16 such that the cutter blade 16 can be selectively driven by the drive shaft 24 and such that the driving engagement between the cutter blade 16 and the drive shaft 24 can be disengaged.

The energizing means 26 can also be an electrical switch 27 operable to shut down the prime mover 14, together with a brake 28 operable to brake the cutter blade 16. The blade brake 28 includes a brake arm 29, as shown in FIG. 6, which is movable between a blade free position, wherein the cutter blade 16 is free to rotate, and a blade braked position, wherein the brake 28 acts to brake the cutter blade 16. When the brake arm 29 is moved from the blade free position to the blade braked position, the brake arm 29 engages the electric switch 27 which serves to lock out the electrical starter or ground the ignition system to shut off the prime mover. Where the prime mover 14 is an electric motor, the brake arm 29 engages the switch 27 to disconnect a source of electric potential to the electric motor. When the brake arm 29 moves back to the blade free position, the prime mover 14 can be either automatically restarted by the disengaging of the switch 27 or manually restarted, depending on the starter system used on the mower 10.

The lawn mower 10 further includes means providing for wheel adjustment and driving of the wheels 18 to allow for self-propulsion of the lawn mower 10. To this end the lawn mower includes means 30 (shown symbolicly in FIG. 1) for engaging the wheels 18 of the lawn mower 10. Any suitable means 30 for propelling the lawn mower 10 can be used, an example of which is more particularly described in Shaw U.S. Pat. No. 2,947,132, issued Aug. 2, 1960, which is incorporated herein by reference.

The lawn mower 10 further includes control means for controlling the self-propulsion of the lawn mower. The control means comprises an upper handle 42 capable of limited independent movement relative to the guide handle 20 on the lawn mower 10. The upper handle 42 is generally U-shaped in construction, as shown in FIG. 4, and incudes a cross bar 44 connecting two arms 45 and 47, and is rotatably attached to the upper or operator end 22 of the guiding handle 20 by suitable means 49.

The control means also includes linkage means movable in response to pivotal movement of the upper handle 42 for causing the operation of the mower propelling means 30. The linkage means includes a rigid member or link 46 connected to the arm 45 of the upper handle 42 at a position above the point of pivotal attachment 49 of the arm 45 to the guiding handle 20. The link 46 is also operably connected to the mower propelling means 30. Forward movement of the upper handle 42 toward the blade housing 12 (as shown in FIG. 5) moves the link 46 forward and causes the operation of the mower propelling means 30. Rearward movement of the upper handle 42 accordingly causes disengagement of the mower propelling means 30.

The lawn mower further includes operating means for operating the energizing means. The operating means includes a control or dead man control bail 50 capable of limited independent movement relative to the upper handle 42. The control bail 50 is generally U-shaped and configured so that a cross bar 52 connecting two arms 54 and 56 of the bail 50 is disposed adjacent the cross bar 44 of the upper handle when in a blade de-energized position so the control bail 50 and upper handle 42 can be grasped by an operator simultaneously. The control bail 50 is connected to the upper handle 42 by suitable means 58 providing for pivotal movement of the control bail 50 relative to the upper handle 42.

The operating means further includes means for operating the energizing means 26 by the pivotal movement of the control bail 50.

More particularly, the means includes a flexible member or bowden wire 60 connected to the control bail 50 adjacent but above the pivotal attachment of the control bail 50 to the upper handle 42. The flexible member 60 is also operably connected to the energizing means 26 to rotate the cutter blade 16 when the flexible member 60 moves rearwardly away from the housing 12 and to de-energize and brake the cutter blade 16 when the flexible member 60 moves forwardly toward the housing 12.

Biasing means are also provided for biasing the flexible member 60 and control bail 50 in the blade de-energized direction. In this embodiment, the biasing means comprises a spring 65, as shown in FIG. 1. A more detailed description of a spring 65 and one energizing means 26 are described in Poehlman, U.S. Pat. No. 4,322,935, issued Apr. 6, 1982, which is incorporated herein by reference. In the energizing means 26 embodiment shown in FIG. 6, the flexible member 60 is operably connected to one side of the brake arm 29 and the spring 65 is connected to the other side of the brake arm 29. In another embodiment, a combination biasing and energizing means 26 can be used, such as the self-biasing clutch and brake means described in Bent et al U.S. Pat. No. 4,307,558, issued Dec. 29, 1981, which is incorporated herein by reference.

Means are further provided for restricting a substantial portion of the flexible member 60 to a predetermined path extending along the guiding handle 20. More particularly, the restricting means includes a pulley 70 rotatably attached to the center of the inside of the guiding handle 20 near the control bail 50 along the path of the flexible member 60 between the control bail 50 and the energizing means 26. The flexible member 60 is guided around and under the pulley 70 and held in a slot 71. The rotational path of the pulley 70 and the pivotal path of movement of the control bail 50 are generally vertical and parallel so as to limit the sideways movement of the flexible member 60 between the pulley 70 and the control bail 50.

Means are further provided for permitting the control bail 50 to pivot independently from the upper handle 42, and the upper handle 42 to rotate independently from the control bail 50. More particularly, the means comprises a guide means or the pulley 70 rotatably attached to the inside of the guiding handle 20 so a periphery 72 of the pulley 70 contacts the flexible member 60 and is generally adjacent the pivotal attachment of the upper handle 42 to the guiding handle 20. As a result of the location of the pulley 70, when the upper handle 42 is pivoted the flexible member 60 rotates about a point generally fixed by the periphery 72 of the pulley and corresponding to where the upper handle 42 pivots on the guiding handle 20. Since the flexible member 60 only rotates and does not move either toward or away from the energizing means 26, the upper handle 42 can be rotated and the mower propelling means 30 operated independently from the operating means. Since the distance of the attachment of the flexible member 60 to the control bail 50 relative to the pulley 70 and upper handle 42 remains the same even though the upper handle 42 has moved relative to the guiding handle 20, the control bail 50 can be pivoted and the operating means can be operated independently from the mower propelling means 30.

Means are further provided for locking the dead man control or bail 50 so as to prevent inadvertent movement of the control bail 50. More particularly, the means includes a generally V-shaped lever 80 pivotally connected to the center of the inside of the upper handle 42 and adjacent the end 82 of the control bail 50. The end 82 of the control bail 50 includes a plate 84 having a rounded edge 86 with a notch 88 engagable with the V-shaped lever 80. As best shown in FIG. 5, when the V-shaped lever 80 is pivoted in a counterclockwise manner away from the control bail 50, the lever 80 is moved away from the end 82 of the control bail 50 and out of the notch 88 and the control bail 50 is free to move towards the operator to operate the energizing means 26 and cutter blade 16. Likewise, when the control bail 50 is in a clutch disengaging position away from the operator, the V-shaped lever 80 can be pivoted toward the control bail 50 and received in the notch 88 to prevent inadvertent movement of the control bail 50 into a cutter blade energizing position. Biasing means or spring 90 on the shaft 92 pivotally connecting the lever 80 to the upper handle 42 biases the lever 80 toward the notch 88 to facilitate the lever's engaging of the notch 88.

FIGS. 2 and 3 illustrate another embodiment of the operating means in combination with a push only lawn mower. A push only lawn mower does not include an upper handle 42, so the operating means is attached, as previously described, to the guiding handle 20 instead of the upper handle 42, with one exception. The means providing for pivotal movement of the control bail 50 relative to the guiding handle 20 includes brackets 90 mounted on the guiding handle 20, and the control bail 50 is pivotally attached to the brackets 90 by suitable means 92 located above the guiding handle 20.

The embodiment illustrated in FIGS. 2 and 3 could also be used on a self-propelled lawn mower which uses self-propelling control means not including a movable upper handle.

Various of the features of the invention are set forth in the following claims.

I claim:

1. A lawn mower comprising a housing, a cutter blade rotatably mounted on said housing, means for selectively rotatably driving said cutter blade, a handle connected to said housing, a pivotable member connected to said handle about an axis, a control movably connected to said pivotable member, an elongated flexible member connecting said control to said means for selectively rotatably driving said cutter blade so as to selectively rotatably drive said cutter blade in response to movement of said flexible member in the direction of the elongation thereof, and means for restricting a substantial portion of said flexible member to a predetermined path along said handle and comprising a pulley rotatably attached to said handle and having a periphery located adjacent said axis and with said flexible member guided around said periphery of said pulley, whereby to afford pivotal movement of said pivotable member without effecting substantial movement of said flexible member.

2. A lawn mower in accordance with claim 1 and further including biasing means biasing said control toward a position wherein said cutter blade is not rotatably driven.

3. A lawn mower in accordance with claim 2 wherein said biasing means comprises a spring.

4. A lawn mower in accordance with claim 2 wherein said biasing means and said means for selectively rotatably driving said cutter blade comprises a self-biasing clutch.

5. A lawn mower in accordance with claim 1 wherein said means for selectively rotatably driving said cutter blade comprises a combination brake and clutch means driven by said drive shaft and engagable and disengagable with said cutter blade.

6. A lawn mower in accordance with claim 1 wherein said means for selectively rotatably driving said cutter blade comprises a prime mover and electric switch means for shutting off said prime mover.

7. A lawn mower in accordance with claim 6 and wherein said means for selectively rotatably driving said cutter blade further includes a brake with a brake arm movable between a blade free position and a blade braked position, wherein movement of said brake arm to said blade braked position operates said electric switch means to de-energize said blade, and wherein said flexible member connects said control to said brake arm.

8. A lawn mower in accordance with claim 1 wherein said control comprises a bail including two arms connected by a cross bar and pivotally attached to said member pivotable, and wherein one of said arms is pivotable in a generally vertical plane and said flexible member is connected to said one arm, and wherein said pulley is rotatable in a generally vertical plane.

9. A self-propelled lawn mower comprising a housing, a cutter blade supported for rotation by said housing, means for selectively rotatably driving said cutter blade, a guiding handle connected to said housing, mower propelling means for propelling said housing over the ground, an upper handle movably attached to said guide handle, linkage means connecting said upper handle to said mower propelling means and movable in response to movement of said upper handle for selectively causing propelling of said housing over the ground, a control movably attached to said upper handle, and second linkage means connecting said control to said means for selectively rotating said cutter blade in response to control movement, said second linkage including means for permitting the independent operation of said control and said upper handle, comprising an elongated flexible cable connecting said control to said means for selectively rotating said cutter blade, and guide means attached to said guiding handle between said control and said housing and adjacent the attachment of said upper handle to said guiding handle, said guide means having said cable guided thereabout and being located such that movement of said upper handle is ineffective to cause displacement of said cable in the direction of the elongation thereof.

10. A self-propelled lawn mower in accordance with claim 9 wherein said upper handle is pivotally attached to said guiding handle, and wherein said guide means comprises a pulley rotatably attached to said guiding handle, and wherein said pulley has a periphery adjacent the pivotal attachment of said upper handle to said guiding handle, and wherein said flexible member is guided around said periphery of said pulley.

11. A self-propelled lawn mower in accordance with claim 9 and further including biasing means biasing said control toward a position wherein said cutter blade is not rotatably driven.

12. A self-propelled lawn mower in accordance with claim 10 wherein said control comprises a bail including two arms pivotally attached to said upper handle and connected by a cross bar, and wherein one of said arms is pivotable in a generally vertical plane, and wherein said flexible member is connected to said one arm, and wherein said pulley is rotatable in a generally vertical plane.

13. A self-propelled lawn mower in accordance with claim 11 wherein said biasing means comprises a spring.

14. A lawn mower in accordance with claim 9 wherein said means for selectively rotatably driving said cutter blade comprises a prime mover and a combination brake and clutch means engagable and disengagable between said prime mover and said cutter blade.

15. A lawn mower in accordance with claim 9 wherein said means for selectively rotatably driving said cutter blade comprises a prime mover and electric switch means for shutting off said prime mover.

16. A lawn mower in accordance with claim 15 and wherein said means for selectively rotatably driving said cutter blade further includes a brake with a brake arm movable between position permitting blade rotation and a blade braked position, wherein movement of said brake arm to said blade braked position operates said electric switch means to shut off said prime mover so as to discontinue blade rotation, and wherein said flexible member connects said control to said brake arm.

17. A self-propelled lawn mower in accordance with claim 11 wherein said biasing means and said means for selectively rotatably driving said cutter blade comprises a selfbiasing clutch.

18. A lawn mower comprising a housing, a cutter blade rotatably supported by said housing, and means for selectively rotatably driving said cutter blade, a handle connected to said housing, a control movably attached to said handle and including a notch, means for operating said means for selectively rotatably driving said cutter blade in response to movement of said control, and lock lever means for preventing inadvertent movement of said control and comprising a V-shaped lever including an apex portion pivotally attached to said handle for movement of said lever between a position wherein said lever is received in said notch and prevents movement of said control, and a position wherein said lever is out of said notch and permits movement of said control.

19. A lawn mower in accordance with claim 18 wherein said control further includes a plate with a rounded edge and attached to said control near the attachment of said control to said handle, and wherein said notch is in said rounded edge of said plate.

20. A lawn mower in accordance with claim 18 and wherein said lock lever means further includes means biasing said lever toward said position wherein said lever is received in said notch.

21. A lawn mower in accordance with claim 18 and further including mower propelling means for propelling said housing over the ground, an upper handle movably attached to said handle, and linkage means for connecting said upper handle to said mower propelling means and movable in response to movement of said upper handle to operate said mower propelling means, and wherein said V-shaped lever and said control are mounted on said upper handle.

22. A lawn mower comprising a housing, a plurality of wheels supporting said housing for travel over the ground, a prime mover supported by said housing, a cutter blade, clutch means connected to and between said prime mover and said cutter blade, a handle connected to said housing, a control handle movably mounted on said handle, linkage means connected to said control handle, to said prime mover, and to one of said wheels for selectively propelling said housing along the ground in response to movement of said control handle, a control element movably mounted on the control handle, and additional linkage means connected to said control element and to said clutch means for selectively engaging said clutch means to rotate said cutter blade in response to control element movement.

23. A self-propelled lawn mower comprising a housing, a cutter blade supported for rotation by said housing, means for selectively rotatably driving said cutter blade, a guiding handle connected to said housing, mower propelling means for propelling said housing over the ground, an upper handle movably attached to said guide handle, linkage means connecting said upper handle to said mower propelling means and movable in response to movement of said upper handle for selectively causing propelling of said housing over the ground, a control movably attached to said upper handle, and second linkage means connecting said control to said means for selectively rotating said cutter blade in response to control movement, said second linkage including means for permitting the independent operation of said control and said upper handle.

* * * * *